Jan. 2, 1962　　　　　J. A. CHESNUT　　　　　3,015,385
SILICONE RUBBER TAPE ROLL
Filed Nov. 6, 1959
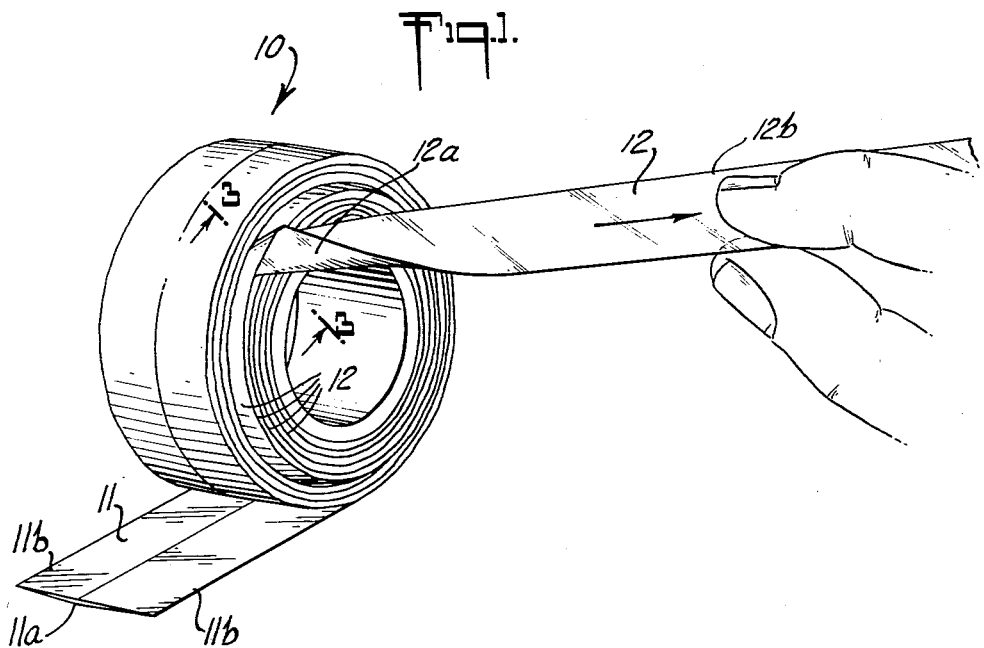
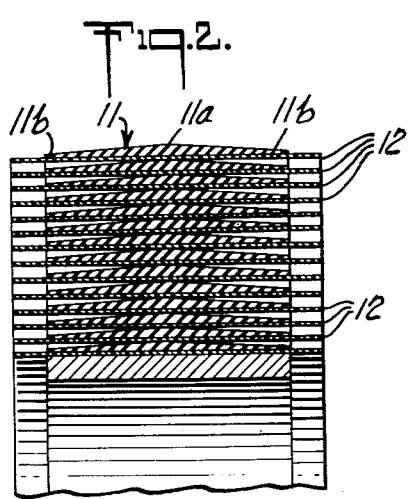
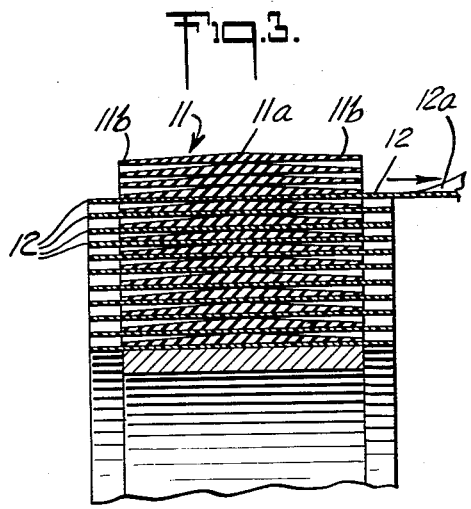

United States Patent Office 3,015,385
Patented Jan. 2, 1962

3,015,385
SILICONE RUBBER TAPE ROLL
James A. Chesnut, Metuchen, N.J., assignor to Johnson & Johnson, a corporation of New Jersey
Filed Nov. 6, 1959, Ser. No. 851,301
4 Claims. (Cl. 206—59)

The present invention relates to a removable interliner for a roll, spool or coil of fusible unsupported silicone rubber tape, which tape has a cross-section such that the center is thicker than the edges, and more particularly to such a roll having a polyethylene film interliner which can be removed by pulling it out from the side of the roll without unrolling the roll itself.

Unsupported silicone rubber tape has been a conventional electrical insulating material for a number of years. Within the last two years unsupported silicone rubber tape of a fusible or self-adhering type has been developed and found use. Even more recently, fusible silicone rubber tape has been extruded with cross sectional shapes other than rectangular (such as lens shape or triangular shape) in attempts to give more uniform wraps when tape is overlapped.

Polyethylene film has for years been used as an interliner for various materials including some flat silicone rubber tapes. However, it has never been used as an interliner for unsupported fusible silicone rubber tapes having cross-sections in the form of lenses, triangles, diamonds, or any other where the middle portion is thicker than the edges. For this purpose polyester films, cellulose acetate butyral films or plastic coated papers have generally been used because they are more rigid and less stretchy than the polyethylene film. Also, they have better heat resistance in case the manufacturing process for making the tape requires it to be supported in hot ovens during curing. When the tape is used, these interliners are removed in sections as the tape is unwound. This is a tedious and time consuming task for the taper. The art is confronted by the problem of providing unwindable rolls of such tape which avoid such disadvantages.

The discoveries associated with the invention and relating to solution of the above problems, and the objects achieved in accordance with the invention as set forth herein include: the provision of a roll of fusible unsupported silicone rubber tape which is readily and uniformly unwindable, said tape having a cross-section such that the center is thicker than at the edges; the provision of a roll of fusible unsupported silicone rubber tape having an interliner, which interliner is readily removable by pulling one edge thereof edgeways while maintaining the silicone rubber tape in roll form, said tape having a cross-section such that the center is thicker than at the edges; the provision of such a roll wherein the liner is wider than the tape and is a thin flexible film composed of a member of the group consisting of polyethylene, polystyrene, and fluorocarbon films; the provision of such a roll wherein the film is a polyethylene; the provision of such a roll wherein the film is a polystyrene; the provision of such a roll wherein the film is a polytetrafluorethylene; and other objects which will be apparent as details or embodiments of the invention are set forth hereinafter, including the attached drawing wherein:

FIGURE 1 is a view of a roll of tape with the liner in the process of being removed and already partially removed therefrom.

FIGURES 2 and 3 are cross-section views taken along view 3—3 of FIGURE 1, FIGURE 2 illustrating the roll with all of the liner therein, and FIGURE 3 showing the roll with the liner partially removed and in the process of being removed.

In these drawings, the spool 10 of the silicone rubber tape 11, having a diamond shape cross-section with the thicker middle portion 11a and the thinner edge portions 11b, includes the polyethylene liner 12. This liner is pulled out edgeways shortly before the spool is used, e.g. by gripping with the hand at 12b and pulling out. In this removal step the film stretches, and twists and rolls as shown in 12a.

In order to facilitate a clear understanding of the invention, the following preferred specific embodiments are described in detail.

Example 1

A thin polyethylene film is used for an interliner of a roll of fusible unsupported silicone rubber tape having as shown in the drawings, a cross-section such that the center is thicker than the edges, which roll is prepared by extrusion and winding, in the usual manner. The polyethylene film interliner is removed by pulling it out from the side of the roll without unrolling the roll itself. Conventional interliners including polyester films, cellophane, and polyethylene coated papers cannot be readily removed in this manner.

The width of the interliner should be in excess of the tape width by at least about 1/8 inch on each side. The thickness of the interliner should not exceed about 0.003 inch.

Other thin flexible polyalkylene films or polytetrafluorethylene film or other fluorocarbon films and polystyrene films may be used in place of the polyethylene film with comparable results. The latter is very easily removed since it breaks or tears readily into small sections. Advantages of the invention may be obtained using thin films such as flexible vinyl polymer and copolymer films (including vinylidene) as well as thin tissue paper impregnated or unified with flexible resins such as polyalkylene, vinyl, acrylic, and the like polymers and copolymers.

Fusible unsupported silicone rubber tape must have some form of interliner or slip sheet between roll layers or else upon standing the layers will bond to each other making uniform unwinding of the roll extremely difficult if not impossible. However, for short periods of time, e.g. up to 1/2 to 1 hour, the tape can be in contact with itself without blocking so much as to prevent an unwinding. In use it is much to the taper's advantage to be able to use a tape with no interliner. Therefore, it is of great advantage to be able to remove the interliner just prior to taping.

The silicone rubber may be any of the commercially available fusible type silicone rubbers or pastes, including the material described in pending U.S. patent application Serial No. 814,289 filed May 19, 1959, or a conventional type such as that described in D. C. Youngs U.S. Patent 2,854,698 issued October 7, 1958 at column 3, lines 32–35.

In view of the foregoing disclosures, variations or modifications thereof will be apparent, and it is intended to include within the invention all such variations and modifications except as do not come within the scope of the appended claims.

I claim:
1. A roll consisting of an unsupported silicone rubber tape having a cross-section thicker at the center than at the edges wound together with a thin interliner strippable from silicone rubber and flexible in all directions, said interliner being wider than the tape and extending beyond the edges thereof in said roll, said interliner being releasably held in the roll in frictional contact with the thicker central portion of the tape only, the edges of the interliner extending between but being relatively free from frictional contact with the edges of the adjacent coils of tape in said roll, whereby said interliner can be removed from said roll without unwinding the tape by grasping the edge of the interliner and pulling it in a direction away from the roll.

2. A roll according to claim 1 in which the interliner is composed of a film of polyethylene flexible in all directions.

3. A roll according to claim 1 in which the interliner is composed of a film of polystyrene flexible in all directions.

4. A roll according to claim 1 in which the interliner is composed of a film of polytetrafluorethylene flexible in all directions.

References Cited in the file of this patent

UNITED STATES PATENTS

| | | |
|---|---|---|
| 1,543,283 | Falor | June 23, 1925 |
| 2,622,656 | Pinsky | Dec. 23, 1952 |